United States Patent [19]
Stultz et al.

[11] Patent Number: 5,724,372
[45] Date of Patent: Mar. 3, 1998

[54] DIODE-PUMPED LASER SYSTEM USING URANIUM-DOPED Q-SWITCH

[75] Inventors: Robert D. Stultz, Bellflower; David S. Sumida, Los Angeles; Milton Birnbaum, Rancho Palos Verdes, all of Calif.

[73] Assignee: Hughes Electronics, Los Angeles, Calif.

[21] Appl. No.: 590,012

[22] Filed: Jan. 22, 1996

Related U.S. Application Data

[63] Continuation-in-part of Ser. No. 375,753, Jan. 20, 1995, Pat. No. 5,557,624.

[51] Int. Cl.[6] ........................................... H01S 3/11
[52] U.S. Cl. ............................ 372/11; 372/68; 372/75
[58] Field of Search ................................. 372/10, 11, 25, 372/40–42, 68, 75

[56] References Cited

U.S. PATENT DOCUMENTS

| | | | |
|---|---|---|---|
| 3,754,190 | 8/1973 | Cross | 372/11 |
| 4,682,336 | 7/1987 | Hendrix et al. | 372/10 |
| 4,979,180 | 12/1990 | Muncheryan | 372/75 X |
| 5,422,899 | 6/1995 | Freiberg et al. | 372/25 |
| 5,557,624 | 9/1996 | Stultz et al. | 372/11 |

OTHER PUBLICATIONS

Stultz et al., "U4+:SrF2 Efficient Saturable Absorber Q Switch For The 1.54 μm Erbium:Glass Laser", *Applied Physics Letters*, 64(8), 21 Feb. 1994, pp. 948–950.

*Primary Examiner*—John D. Lee
*Attorney, Agent, or Firm*—Gordon R. Lindeen, III; Georgann S. Grunebach; Wanda K. Denson-Low

[57] ABSTRACT

A laser system includes a laser resonator cavity having a resonant path and an Er,Yb:glass lasing element with an output of from about 1.5 to about 1.6 micrometers within the laser resonator cavity. A diode array optically pumps the lasing element to emit light. A Q-switch lies along the resonant path within the laser resonator cavity. The Q-switch is formed of a host material having a concentration of uranium ions therein, so as to be a saturable absorber of the light emitted by the lasing element. The Q-switch is preferably a uranium-doped fluoride such as $U:CaF_2$, $U:SrF_2$, or $U:BaF_2$.

19 Claims, 3 Drawing Sheets

1

DIODE-PUMPED LASER SYSTEM USING URANIUM-DOPED Q-SWITCH

This application is a continuation-in-part of application Ser. No. 08/375,753, filed Jan. 20, 1995, now U.S. Pat. No. 5,557,624.

BACKGROUND OF THE INVENTION

This invention relates to lasers, and, more particularly, to a laser system having a passive Q-switch.

A laser is a device that emits a spatially coherent beam of light of a specific wavelength. In a laser, a lasing element is placed within a laser resonator cavity and pumped with an energy source. The pumping action produces stored energy and gain within the lasing element. When the gain exceeds the losses so that there is a net light amplification per round trip of the light in the resonator cavity, laser light begins to build up in the cavity, and stored energy is extracted from the lasing element. This energy can be released in the form of a very short, intense light pulse by using a device called a Q-switch.

A Q-switch operates by initially increasing the cavity losses, thus preventing lasing action, while an amount of stored energy and gain is achieved that greatly exceeds the losses that would otherwise exist. The Q-switch losses are then quickly lowered, producing a large net amplification in the cavity, and an extremely rapid buildup of laser light occurs. The light pulse begins to decay after the stored energy in the lasing element has been depleted such that the gain once again drops below the cavity losses.

The Q-switch can be an active device which is controlled or driven by an external signal. The Q-switch can also be a passive structure that has no external control, but instead operates periodically as a result of its own properties. The present invention relates to a laser system using such a passive Q-switch.

A saturable absorber can be used as a passive Q-switch. The saturable absorber is a crystal having transmittance properties that vary as a function of the intensity of the incident light that falls upon the crystal. When light of low intensity is incident upon the saturable absorber, its light transmittance is relatively low, resulting in high cavity losses. As the incident light energy increases due to the buildup of energy within the laser resonator cavity, the light transmittance of the crystal increases. At some point, the light transmittance increases to a level such that the crystal "bleaches", i.e., becomes transparent, so that the cavity losses become low, and an intense Q-switched light pulse is emitted.

The properties of a saturable absorber crystal depend upon the wavelength of the incident light. A crystal which performs as a saturable absorber at one wavelength typically will not perform in the same manner at significantly different wavelengths. Further, a crystal may act as a saturable absorber for relatively low incident intensities, but higher intensities may damage the crystal. There is therefore an ongoing search for effective saturable absorber crystals for use as Q-switches in particular wavelength ranges.

One of the laser operating ranges of interest is at about 1.5–1.6 micrometers wavelength. This wavelength range is of particular importance because light in this range will not damage the human eye at moderate intensities. For example, the Er:glass laser emits light at about 1.5–1.6 micrometers wavelength, and can be used as an eye-safe laser. (In this accepted notation, A:B indicates a material having an ion of A doped into a B host crystal.) In the past, Q-switching of the Er:glass laser has been accomplished by an active, rotating prism Q-switch.

There is a need for an eye-safe laser having a high power output and a saturable absorber Q-switch operable in the 1.5–1.6 micrometer wavelength range that is compatible with the high-power output of the laser and performs with a state-of-the-art output energy per pulse. The saturable absorber Q-switch must be resistant to damage from the passage therethrough of a high-intensity laser beam. The present invention fulfills this need, and further provides related advantages.

SUMMARY OF THE INVENTION

The present invention provides an eye-safe laser system having a passive Q-switch and a light output in the 1.5 micrometer wavelength range. The laser system has a high power output and a high pulse repetition rate. The Q-switch material is made of a doped crystal and is operable over a range of wavelengths at about 1.5 micrometers, and is stable under the high power output of the laser.

In accordance with the invention, a laser system comprises a laser resonator cavity having a resonant path and a lasing element within the laser resonator cavity. The lasing element comprises a lasing host material doped with erbium and a sensitizer ion dopant that absorbs energy from a pumping light beam and transfers that energy to the erbium. A diode optical pump directs the pumping light beam into the lasing element, and a Q-switch lies along the resonant path within the laser resonator cavity and comprises a Q-switch host material having uranium ions doped therein.

The diode optical pump preferably includes a diode laser such as an indium-gallium-arsenide diode laser array operating in the 970 nanometer absorption band, and optical components to introduce the pumping light beam into the lasing element. In one embodiment, the diode optical pump includes a lens to focus the pumping light beam output into the lasing element and a mirror on the far side of the lasing element to reflect pumping energy back into the lasing element.

The erbium-doped glass lasing element produces eye-safe light having a wavelength of about 1.5–1.6 micrometers. The sensitizer ion dopant that absorbs energy from the pumping light beam is selected in conjunction with the output wavelength of the diode laser. In one preferred case of an indium-gallium-arsenide diode laser operating at 940 nanometers, the sensitizer ion dopant of the lasing element that absorbs energy from the pumping light beam is ytterbium.

The Q-switch host material is preferably a fluoride crystal. Most preferably, the Q-switch host material is calcium fluoride, strontium fluoride, or barium fluoride.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
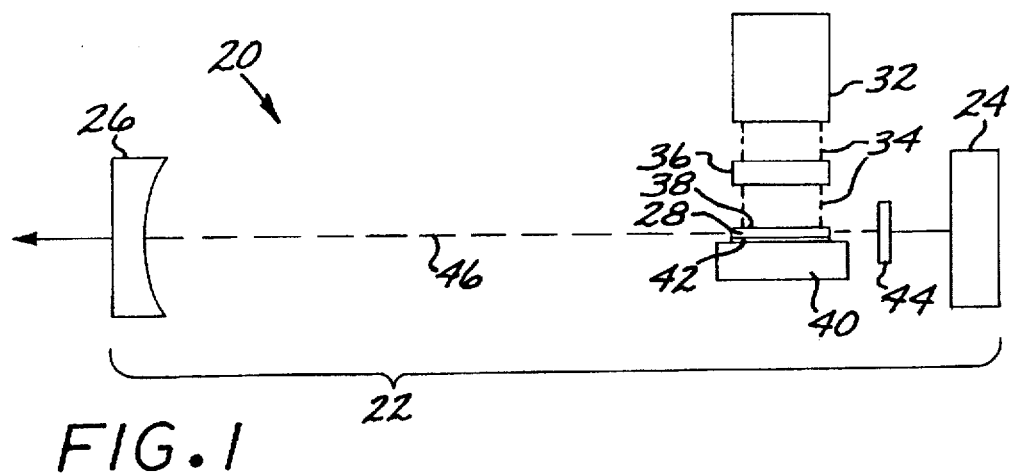
FIG. 1 is a schematic drawing of a diode-pumped system according to the invention.

FIG. 1 schematically illustrates a laser system 20 according to the present invention. The laser system 20 includes a laser resonator cavity 22. At a first end of the cavity 22 is a flat first-end mirror 24, which has a high reflectivity, preferably substantially 100 percent for light at about the wavelength of the output of the laser system. At a second end of the cavity 22 is a curved outcoupler mirror 26 having a reflectivity that is less than 100 percent for light at about the wavelength of the output of the laser system.

A lasing element 28 is positioned within the laser resonator cavity 22. The lasing element 28 is in the form of a doped lasing element host material. The lasing element host material is preferably glass such as a phosphate or silica glass. A first dopant is erbium, which, when properly stimulated in the lasing element host material, emits coherent light having a wavelength in a range at about 1.5 to about 1.6 micrometers, most typically about 1.53 micrometers. The erbium is preferably present in a dopant concentration of from about $10^{19}$ to about $10^{20}$ per cubic centimeter. A second, sensitizer ion, dopant absorbs energy from a pumping light beam and efficiently transfers that energy to the first dopant. In the preferred case, the pumping light beam has a wavelength in the 970 nanometers absorption band. The second dopant is selected as ytterbium in this case. The ytterbium is preferably present in a dopant concentration of from about $10^{20}$ to about $10^{21}$ per cubic centimeter.

The lasing host material may optionally be doped with a third dopant. For example, the third dopant may be uranium, which serves as a Q-switch within the lasing host material so that no separate Q-switch is required. The uranium, when present, is preferably present in a dopant concentration of from about $10^{18}$ to about $10^{20}$ per cubic centimeter. In this case, the mirror 24 may be replaced with a dielectric coating on the end of the lasing element.

Figure 2:
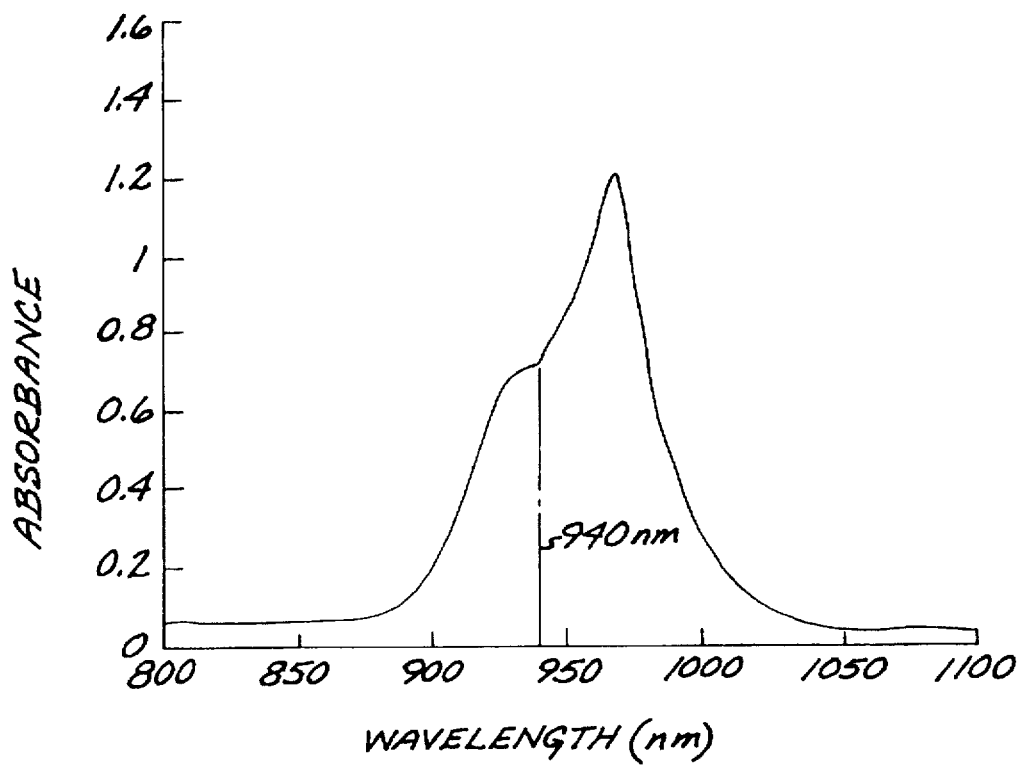
FIG. 2 is a graph of the absorption of the Er,Yb:glass lasing element near 1 micrometer wavelength input energy.

A diode optical pump 30 optically pumps the lasing element 28. This diode optical pump 30 preferably includes a diode laser array 32 that produces the pumping light beam 34. FIG. 2 illustrates the absorbance of the preferred lasing element 28 as a function of the wavelength of the pumping light beam in the 970 nanometer band. The pumping light beam would most preferably have a wavelength of about 970 nanometers. However, no diode having that wavelength was conveniently available to the inventors for their use in practicing the invention. Accordingly, one operable diode is an available indium-gallium-arsenide diode array having a pumping light wavelength output at 940 nanometers, a wavelength that is, as seen in FIG. 2, well within the 970 nanometer band. A cylindrical lens 36 is positioned between the diode laser array 32 and the lasing element 28 to focus the pumping light beam 34 through a side surface 38 and into the lasing element 28. A polished copper plate 40 having a thin layer 42 of gold plated thereon is positioned on the far side of the lasing element 28. The lasing element 28 lies between the gold-coated copper plate 40, on the one hand, and the diode laser array 32 and the lens 36, on the other hand. The gold-coated copper plate acts as a mirror to reflect that portion of the pumping light beam which passes through the lasing element 28, back into the lasing element to achieve two-pass pumping. Equivalently, the gold-coated copper plate mirror could be replaced by a dielectric reflective coating on the glass lasing element.

A Q-switch 44 is positioned within the laser resonator cavity 22 along a resonant path 46 that passes through the lasing element 28 and the mirrors 24 and 26. In the illustrated laser system 20, the Q-switch 44 is between the first-end mirror 24 and the lasing element 28. In this architecture, the mirror 24 may be replaced with a high-reflectivity coating on the side of the Q-switch remote from the lasing element. The Q-switch may equivalently be placed between the lasing element 28 and the outcoupler mirror 26. The mirror 24 could then be replaced by a high-reflectivity coating on the end of the lasing element where the mirror 24 was previously positioned, if desired. The Q-switch effect may also be obtained by co-doping uranium into the host material of the lasing element 28, so that the Q-switching effect is obtained within the lasing element itself. In this case, the back of the lasing element may be coated with a reflective coating in place of the mirror 24. The Q-switch 44 is a saturable absorber of light in the wavelength range at about 1.5–1.6 micrometers, the lasing range of the erbium-doped glass lasing element 28.

Preferably, the Q-switch 44 is a crystal formed of a Q-switch host material with a sufficient concentration of uranium ions therein to act as a saturable absorber in the wavelength range of from about 1.5 to about 1.6 micrometers. The uranium concentration is preferably from about $10^{18}$ to about $10^{20}$ per cubic centimeter. The Q-switch material desirably has a higher absorption cross section, preferably a much higher absorption cross section, than the stimulated emission cross section of the lasing element 28.

The host material of the Q-switch crystal 44 is preferably a fluoride salt. Most preferably, the host material is one of the di-fluorides such as calcium fluoride ($CaF_2$), strontium fluoride ($SrF_2$), or barium fluoride ($BaF_2$). Of these hosts, $CaF_2$ and $SrF_2$ are particularly favored because the uranium absorption cross section is higher in these hosts than in $BaF_2$, and the damage threshold and hardness of these hosts is higher than for $BaF_2$. The crystal structure of these fluorides is the cubic fluorite structure.

Figure 6:
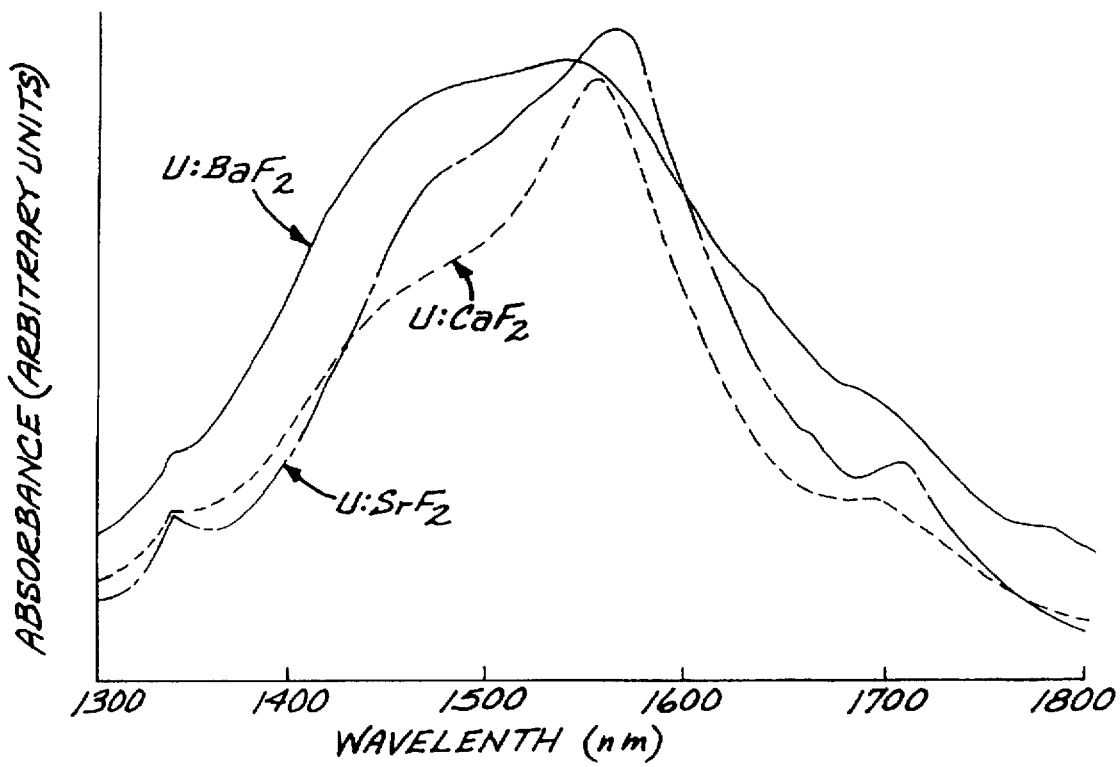
FIG. 6 is a graph of the absorption spectrum of uranium doped into barium fluoride, calcium fluoride, and strontium fluoride host crystals in the wavelength range of interest.

The preferred Q-switch in crystal form can therefore be described as uranium-doped calcium fluoride (U:$CaF_2$), uranium-doped strontium fluoride (U:$SrF_2$), and uranium-doped barium fluoride (U:$BaF_2$). (Some authorities have described the active uranium ion as $U^{2+}$, while more recently, it has been suggested that the active uranium ion is $U^{4+}$. For the present purposes this debate is not pertinent, as it is only necessary that the U-doped crystals exhibit an absorption spectrum of the general type shown in FIG. 6, wherein there is a significant absorption cross section in the 1.5–1.6 micrometer range.

A laser system 20 of the form illustrated in FIG. 1 was assembled. The laser resonator cavity was 10 centimeters long. The first-end mirror 24 was made of fused silica and was coated on the side facing the lasing element 28 with a multilayer dielectric stack coating in order to increase its reflectivity in the range of about 1.5–1.6 micrometers wavelength incident light. The outcoupler mirror 26 was made of fused silica with a radius of curvature of 10 centimeters on the side facing the lasing element. The side facing the lasing element was coated with a multilayer dielectric stack coating to achieve a reflectance of about 85 percent.

The lasing element 28 was QE-7 phosphate glass host doped with 0.5 weight percent $Er_2O_3$ and 13 weight percent $Yb_2O_3$. The lasing element was an uncoated rectangular slab 10 millimeters long and a cross-sectional rectangular shape 1 millimeter by 5 millimeters. The lasing element was obtained from Kigre, Inc.

The lasing element was pumped through its side surface (so that the pumping light beam passed parallel to the 1 millimeter dimension of the lasing element) by a 5-bar InGaAs diode array 32, operating at a pumping light output wavelength of 940 nanometers. The diode array was purchased from SDL, Inc. The diode array was operated in a quasi-continuous wave mode with a maximum output of 250 millijoules in a 1 millisecond pulse. The light output of the diode array was focused on the lasing element using a 12.7 millimeter focal length cylindrical lens 36. The diode array was mounted to a water-cooled heat sink, but the lasing element was not actively cooled. The gold-plated copper diode pump mirror 40, 42 was used as shown in FIG. 1. (Preferably, for optimum efficiency the optical components would be coated with antireflective coatings. For this prototype unit, the antireflective coatings were not used.)

The Q-switch 44 was a 1.3 millimeter thick by 9 millimeter diameter crystal of uncoated calcium fluoride doped with a uranium concentration of $2.5 \times 10^{19}$ per cubic centimeter. The Q-switch crystal had an internal transmittance of about 80 percent for 1.533 millimeter wavelength light.

Figure 3:
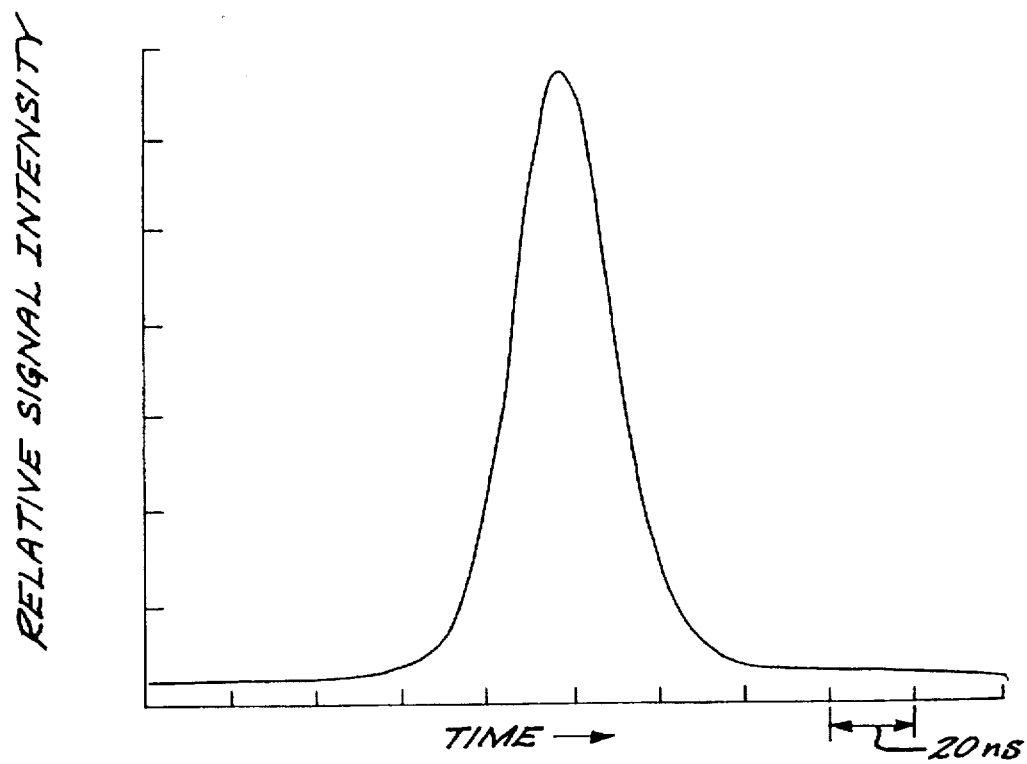
FIG. 3 is a graph of relative signal intensity as a function of time for a single pulse output of the laser system.
Figure 4:
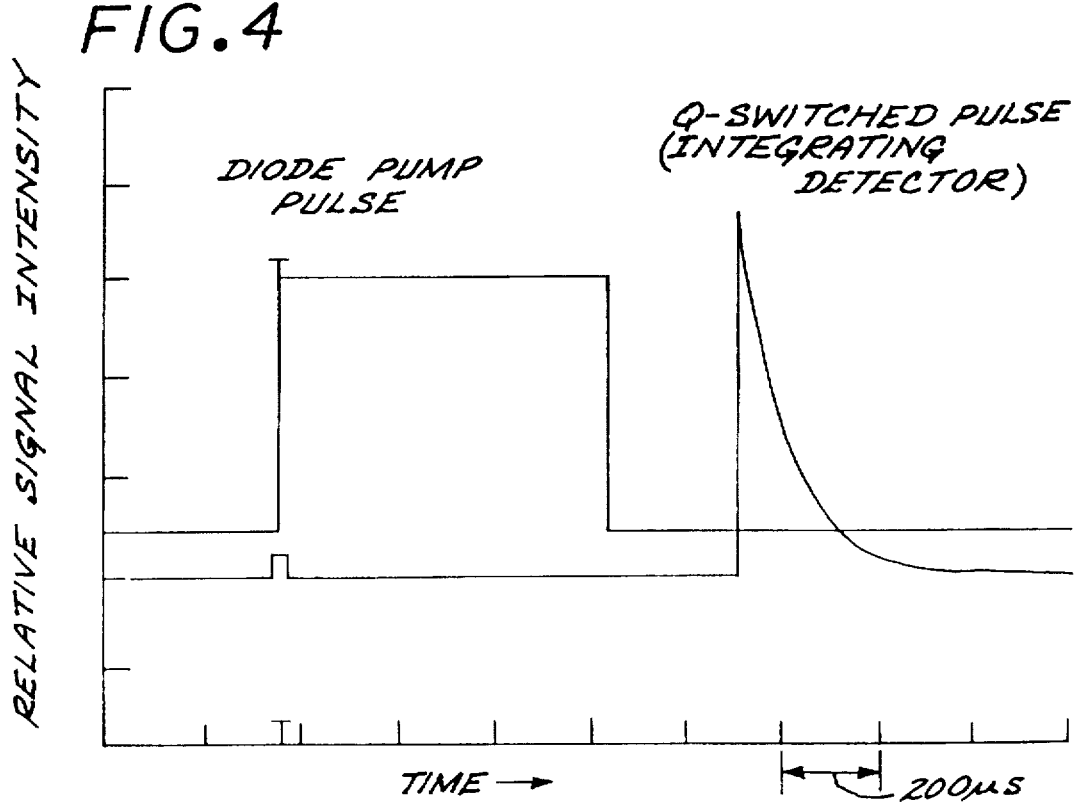
FIG. 4 is a graph showing the delay in the Q-switched pulse as related to the pulse of the pumping light beam.
Figure 5:
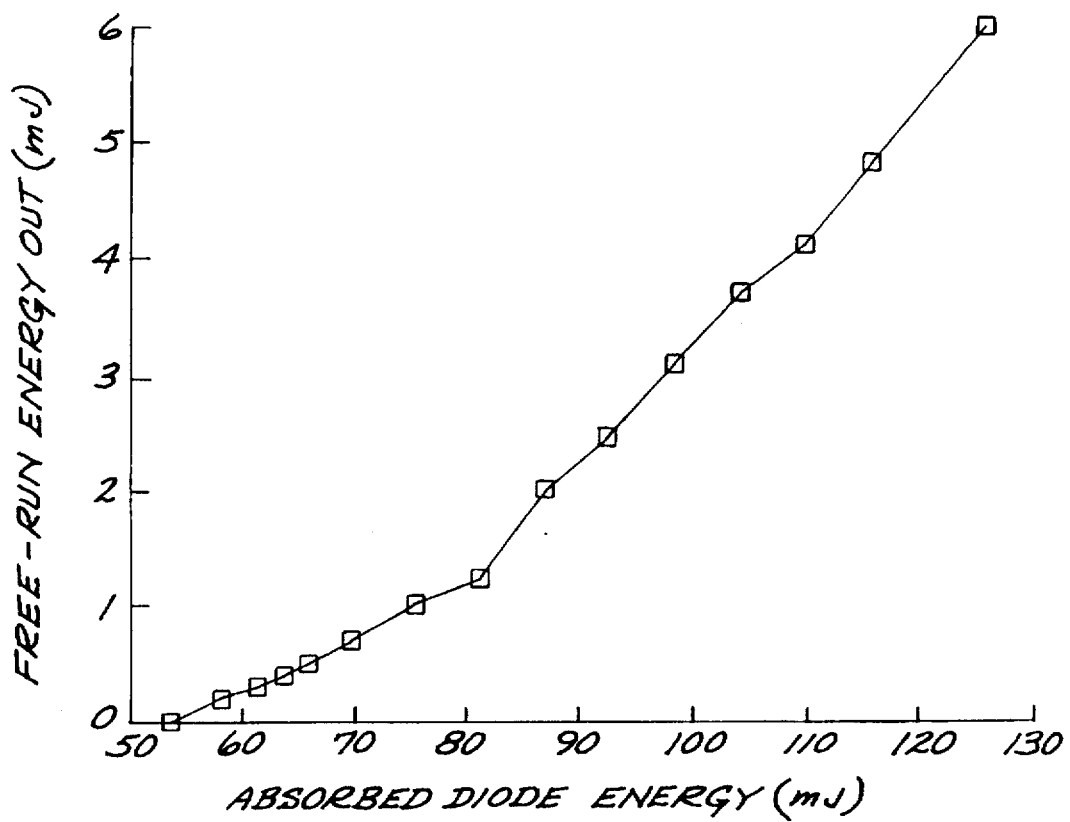
FIG. 5 is a graph of free-running output energy of the laser system as a function of absorbed diode energy.

With this prototype laser system, 0.25 millijoule pulse energies were obtained with full-width, half-maximum pulse widths of 28 nanoseconds, as seen in FIG. 3. The pulse repetition frequency of the Q-switched laser system was varied from 1 to 12 hertz with negligible changes in pulse energy or shape. The laser system was operated at 12 hertz for several minutes continuously, and at 10 hertz for longer than one hour. As the pulse repetition frequency was increased above 12 hertz, the pulses became intermittent after a few seconds of operation. Close to threshold, the 1.5 micrometer output pulse was delayed by more than 200 microseconds, relative to the end of the diode pump pulse, as shown in FIG. 4. The single-pulse threshold was 104 millijoules of absorbed diode pump energy. The double-pulse threshold was 112 millijoules of absorbed diode pump energy. The free-running laser, with the Q-switch removed, was typically multi-transverse mode (except near threshold), and had an output energy of about 3.7 millijoules at an input corresponding to the threshold with the Q-switch installed, as shown in FIG. 5.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser system, comprising:
   a laser resonator cavity having a resonant path;
   a lasing element within the laser resonator cavity, the lasing element comprising a lasing host material doped with erbium and a dopant that absorbs energy from a pumping light beam and transfers that energy to the erbium, wherein the dopant that absorbs energy from the pumping light beam is ytterbium;
   a diode optical pump disposed to direct the pumping light beam into the lasing element; and
   a Q-switch lying along the resonant path within the laser resonator cavity, the Q-switch comprising a Q-switch host material having uranium ions doped therein.

2. The laser system of claim 1, wherein the laser resonator cavity comprises:
   a flat mirror at a first end thereof, the flat mirror having a reflectivity of substantially 100 percent at the wavelength of the output of the laser system; and
   a curved outcoupler mirror at a second end thereof, the curved outcoupler mirror having a reflectivity of less than 100 percent at the wavelength of the output of the laser system.

3. The laser system of claim 1, wherein the diode optical pump comprises:
   a diode; and
   a diode lens positioned between the diode and the lasing element.

4. The laser system of claim 3, wherein the diode optical pump further comprises:
   a diode optical pump mirror disposed such that the lasing element is between the diode lens and the diode optical pump mirror.

5. The laser system of claim 3, wherein the diode optical pump is positioned so as to direct a diode optical pump light output through a side surface of the lasing element.

6. The laser system of claim 1, wherein the Q-switch host material comprises a fluoride crystal.

7. The laser system of claim 1, wherein the Q-switch host material comprises a fluoride host crystal selected from the group consisting of calcium fluoride, strontium fluoride, and barium fluoride.

8. The laser system of claim 1, wherein the lasing host material is glass.

9. The laser system of claim 1, wherein the diode optical pump comprises a diode that produces light at a wavelength in the 970 nanometer band.

10. A laser system, comprising:
    a laser resonator cavity having a resonant path;
    a lasing element within the laser resonator cavity, the lasing element comprising a lasing host material doped with erbium and a dopant that absorbs energy from a pumping light beam and transfers that energy to the erbium;
    a diode optical pump disposed to direct the pumping light beam into the lasing element; and
    a Q-switch lying along the resonant path within the laser resonator cavity, the Q-switch comprising a Q-switch host material having uranium ions doped therein, wherein the lasing host material is further doped with uranium to form the Q-switch.

11. The laser system of claim 10, wherein the dopant that absorbs energy from a pumping light beam is ytterbium.

12. A laser system, comprising:
    a laser resonator cavity having a resonant path;
    a lasing element within the laser resonator cavity and having a lasing element side surface, the lasing element comprising glass doped with erbium and ytterbium;
    a diode optical pump disposed to direct a pumping light beam into the side surface of the lasing element; and
    a Q-switch lying along the resonant path within the laser resonator cavity, the Q-switch comprising a saturable absorber selected from the group consisting of U-doped calcium fluoride, U-doped strontium fluoride, and U-doped barium fluoride.

13. The laser system of claim 12, wherein the laser resonator cavity comprises:
    a flat mirror at a first end thereof, the flat mirror having a reflectivity of substantially 100 percent at the wavelength of the output of the laser system; and
    a curved outcoupler mirror at a second end thereof, the curved outcoupler mirror having a reflectivity of less than 100 percent at the wavelength of the output of the laser system.

14. The laser system of claim 12, wherein the diode optical pump comprises:

a diode; and a diode lens positioned between the diode and the lasing element.

15. The laser system of claim 14, wherein the diode is an indium-gallium-arsenide diode.

16. The laser system of claim 14, wherein the diode optical pump further comprises:

a diode optical pump mirror disposed such that the lasing element is between the diode lens and the diode optical pump mirror.

17. The laser system of claim 16, wherein the lasing element is further doped with uranium to form the Q-switch.

18. A laser system, comprising:

a laser resonator cavity having a resonant path;

a lasing element within the laser resonator cavity, the lasing element emitting, under stimulation, light at a wavelength of from about 1.5 to about 1.6 micrometers, the lasing element including the dopant ytterbium;

means for optically pumping the lasing element, the means for optically pumping including a diode light source; and a Q-switch lying along the resonant path within the laser resonator cavity, the Q-switch comprising a host material having uranium ions doped therein, the Q-switch being a saturable absorber of light of a wavelength of from about 1.5 to about 1.6 micrometers.

19. The laser system of claim 18, wherein the Q-switch comprises a saturable absorber selected from the group consisting of U-doped calcium fluoride, U-doped strontium fluoride, and U-doped barium fluoride.

* * * * *